United States Patent
Lapoint, Jr.

[11] Patent Number: 5,549,826
[45] Date of Patent: Aug. 27, 1996

[54] FILTRATION BAG

[76] Inventor: John H. Lapoint, Jr., 13 Hemlock La., Falmouth, Me. 04105

[21] Appl. No.: 260,207

[22] Filed: Jun. 10, 1994

[51] Int. Cl.⁶ .................................................. B01D 29/27
[52] U.S. Cl. .................... 210/489; 210/493.5; 210/497.2
[58] Field of Search ............................ 55/380, 475, 498, 55/500, 521, 381, 382, 511; 210/448, 452, 493.1, 493.5, 497.01, 497.2, 448, 489, 490

[56] References Cited

U.S. PATENT DOCUMENTS

| | | | |
|---|---|---|---|
| 2,188,428 | 1/1940 | Evans | 55/380 |
| 3,327,859 | 6/1967 | Pall | 210/459 |
| 3,757,957 | 9/1973 | Smith | 210/497.3 |
| 3,853,508 | 12/1974 | Gordon et al. | 55/380 |
| 3,890,290 | 6/1975 | McCabe | 55/380 |
| 4,304,579 | 12/1981 | Granville et al. | 55/381 |
| 4,874,586 | 10/1989 | Szymanski et al. | 55/380 |

*Primary Examiner*—W. L. Walker
*Attorney, Agent, or Firm*—Frederick R. Cantor, Esq.

[57] ABSTRACT

A fluid filtration bag includes an outer porous fabric sleeve, and inner porous fabric liner, and a coherent filler material between the sleeve and liner. The filler material can act as the ancillary filtering media, while the sleeve and liner can act as containment mechanisms for the filler material. The liner has a pleated configuration, in which trough areas of the pleats are stitched to the fabric sleeve to form a series of tubes for containment and support of the filler material.

1 Claim, 1 Drawing Sheet

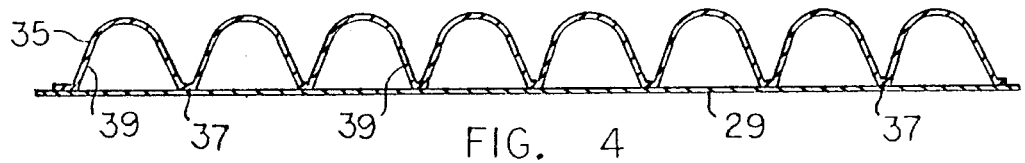
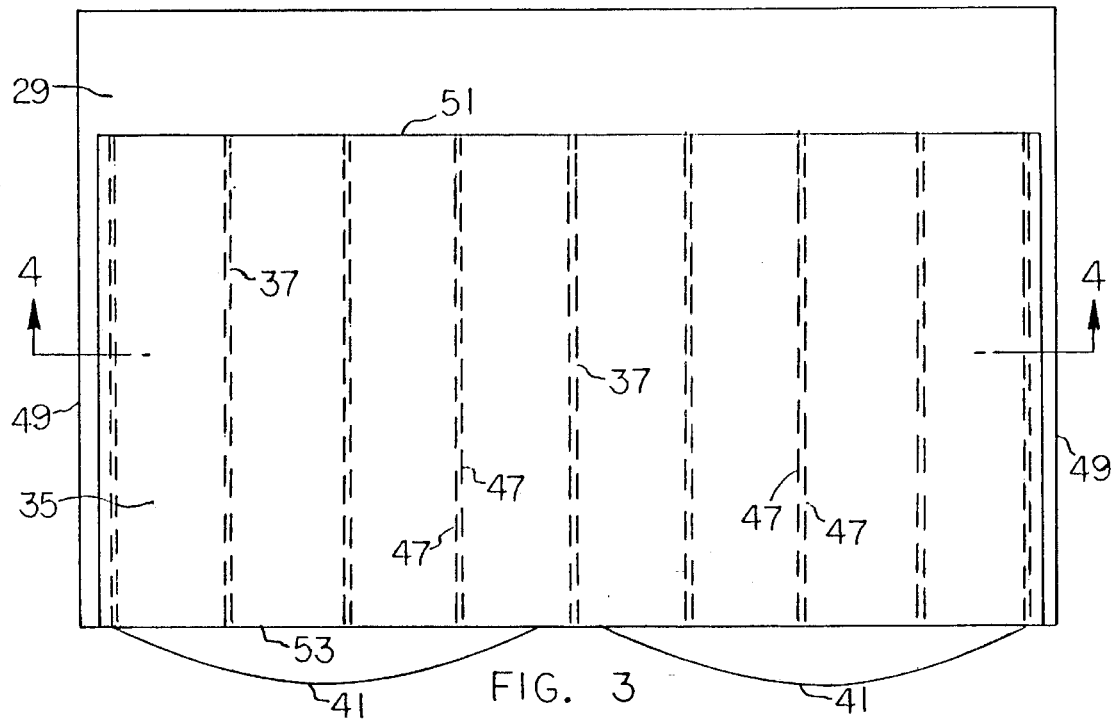
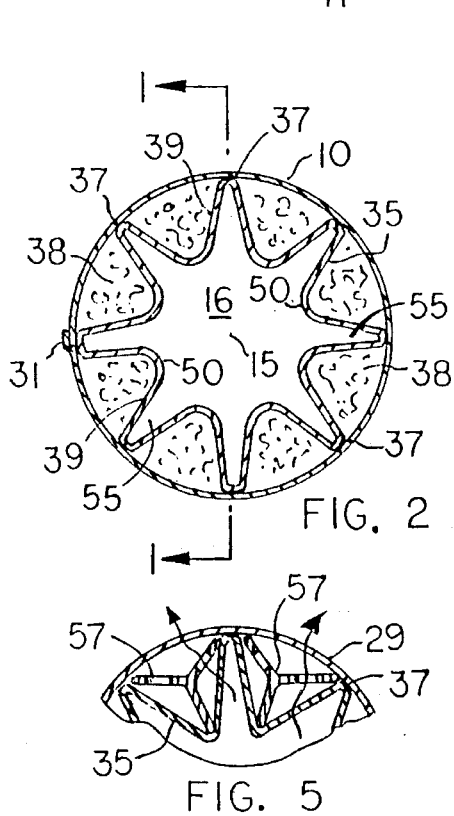
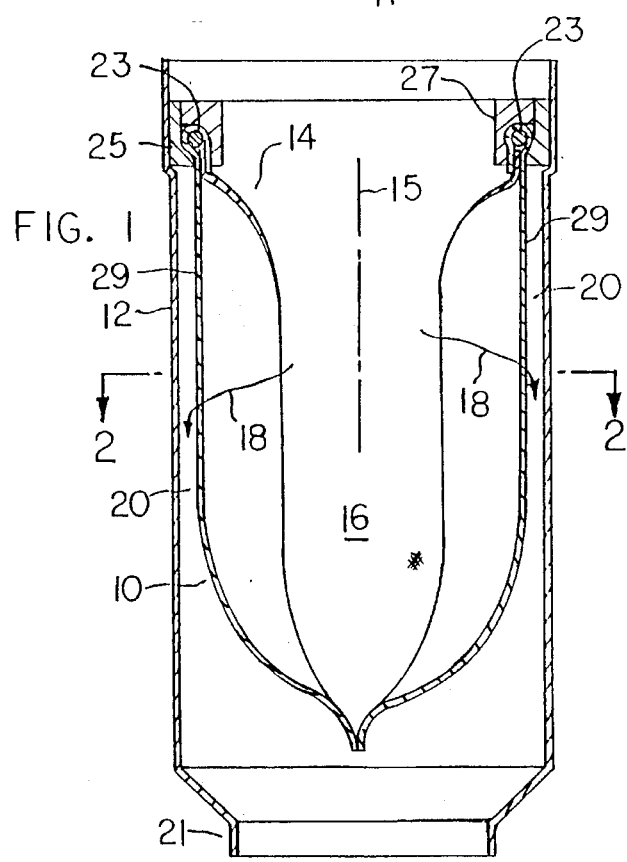

FILTRATION BAG

BACKGROUND OF THE PRESENT INVENTION

1. Field of the Invention

The present invention relates to filtration devices.

The present invention more particularly relates to filtration bags formed out of porous fabric materials.

2. Prior Developments

It has been proposed to filter fluids, e.g. particle-laden liquids, using open-mouthed bags formed out of porous woven fabrics.

In one known arrangement, a porous fabric bag has an open mouth seated on an annular shoulder in a rigid tubular duct. Liquid flows through the open mouth of the bag into the bag interior space. Particulates are trapped in the pores of the fabric bag, while the liquid flows through the porous bag wall into the annular space formed between the duct side wall and the bag side surface.

One problem with such filtration bags is that the fabric filtration media has a comparatively small depth (defined by the thickness of the fabric). The pores in the fabric become clogged with particulates after a relatively short service life.

There is a need for a filtration bag having a relatively thick porous wall construction, whereby the pores in the bag are enabled to remain in a relatively unclogged condition for a relatively long period of time.

SUMMARY OF THE PRESENT INVENTION

An object of the present invention is to provide a filtration device.

A further object of the present invention is, more particularly, directed to provide a bag-type filtration device having a relatively thick wall structure, whereby the bag will remain effective as a filtration device for a relatively long period of time. The filtration bag is designed to be of double-wall construction so that the bag has two filtration layers.

In its preferred form, the invention comprises a bag that includes an outer porous fabric sleeve, an inner porous fabric liner located within the sleeve, and a filler material occupying the annular space between the sleeve and the liner. The sleeve, liner and filler material cooperatively define a multi-layer filtration media, wherein the filler material separates the porous fabric layers, to thus prevent a blinding or obstructing action by the fabric. The filler material increases the depth of the filtration media, while the sleeve and liner form a support structure and containment mechanism for the filler material.

Various materials can be used as the filler material. For example, the filler material can be open cell foam, cotton batting, wool, cloth strips, or spun fiberglass filaments. In order to evenly distribute and stabilize the fibrous filler material, the fabric sleeve and liner are stitched together to form a multiplicity of circumferentially spaced pleats extending parallel to the sleeve axis. The pleats form stitched connections between the liner and the inner surface of the fabric sleeve, so that the liner and sleeve cooperatively form a series of fabric tubes or pockets enclosing separate sections of the fibrous filler material.

By containing the filler material within a multiplicity of fabric tubes or pockets, the filler material becomes somewhat more coherent and resistant to fluid pressure forces that might tend to spread the fibers of the filler material apart so as to form holes. The filler material retains its coherence and structural integrity. A primary function of the filler material is to act as a spacer between the liner and the fabric sleeve.

The present invention is concerned with a filtration bag having a relatively long service life and a relatively great filtration capacity. The bag is designed to handle relatively large flow rates, without imposing unreasonably high pressure drops on the flowing fluid.

In summary, and in accordance with the above discussion, the foregoing objectives are achieved in the following embodiments.

1. A filtration bag, comprising:

an outer fabric sleeve having first and second ends; said sleeve having a central axis;

an inner fabric liner located within said sleeve in generally concentric relation to said central axis;

a multiplicity of pleats joining said sleeve and said liner at circumferentially spaced points around the sleeve, said pleats extending parallel to said central axis to form a plurality of circumferentially spaced pockets; and a filler material filling said pockets so that fluid is required to flow through the filler material in order to move from the bag interior to the space surrounding the bag.

2. The filtration bag, as described in paragraph 1, wherein said fabric liner comprises fabric loops protruding from said fabric sleeve toward said central axis to define said pockets.

3. The filtration bag, as described in paragraph 2, wherein each pocket is defined by a fabric loop and an associated section of the fabric sleeve; and each said loop having a circumferential length that is appreciably greater than the corresponding length of the associated fabric sleeve section.

4. The filtration bag, as described in paragraph 3, wherein said fabric sleeve has a circular cross section.

5. The filtration bag, as described in paragraph 1, wherein each pleat comprises plural rows of stitches, whereby the pockets are spaced apart by the width dimensions of the pleats.

6. The filtration bag, as described in paragraph 1, and further comprising a wire annulus located at said first end of said outer fabric sleeve; and said fabric sleeve being looped around said wire annulus to form a reinforced mouth for the bag.

7. The filtration bag, as described in paragraph 6, wherein said second end of said fabric sleeve comprises fabric edge areas stitched together so that said second end of the sleeve is closed.

8. The filtration bag, as described in paragraph 1, wherein the filler material in each pocket constitutes a spacer means for preventing the respective pocket from collapsing.

9. The filtration bag, as described in paragraph 1, wherein said fabric sleeve is formed of a single fabric sheet.

10. The filtration bag, as described in paragraph 9, wherein said fabric liner is formed of a single fabric sheet.

11. The filtration bag, as described in paragraph 10, wherein there are eight circumferentially spaced pockets.

12. The filtration bag, as described in paragraph 11, wherein the liner forms fabric loops that protrude inwardly from the fabric sleeve to define the circumferentially spaced pockets; and said loops being separated by narrow crevices.

BRIEF DESCRIPTION OF THE DRAWINGS

FIG. 1, is a longitudinal sectional view, taken through a filtration bag constructed according to the invention. The bag is shown mounted in a flow duct of generally conventional design. FIG. 1 is taken on line 1—1 in FIG. 4.

FIG. 2, is a transverse sectional view, taken on line 2—2 in FIG. 1.

FIG. 3, is a plan view, of a fabric assembly that can be used to make the bag shown in FIGS. 1 and 2.

FIG. 4, is a sectional view, taken on line 4—4 in FIG. 3.

FIG. 5, is a fragmentary sectional view, taken in the same direction as FIG. 2, but illustrating another embodiment of the invention.

DESCRIPTION OF THE PREFERRED EMBODIMENTS OF THE PRESENT INVENTION

FIG. 1, is a longitudinal sectional view, taken through a filtration bag constructed according to the invention. The bag is shown mounted in a flow duct of generally conventional design. FIG. 1, is taken on line 1—1 in FIG. 4.

FIG. 2, is a transverse sectional view, taken on line 2—2 in FIG. 1.

FIGS. 1 and 2 show a filtration bag 10 mounted within a rigid flow duct 12 for filtering particulates out of a fluid stream that is moving in a generally downward direction.

Filtration bag 10 is a generally upright tubular structure having an open mouth 14 at its upper end, and a closed lower end. The fluid flows downwardly through mouth 14 into the bag interior space 16, and thence radially outwardly through the bag side wall, as indicated by the fluid path arrows 18. Particulates are trapped in the pores of the filtration bag side wall; the filtered fluid flows generally downwardly in the annular space 20 between the bag side wall and the wall of duct 12. Duct 12 can have a circular cross section.

The filtered fluid is discharged through an exit opening 21 in the lower end of duct 12. In an alternate arrangement, not shown, the exit opening is formed in the side wall of the rigid duct.

Filtration bag 10 can be mounted in duct 12 in various ways. As shown, the upper end of the bag comprises a fabric wall looped around a stiff wire reinforcement ring, or annulus, 23; the mating areas of the fabric loop are stitched together to retain the reinforcement wire within the loop, whereby the stiff wire and fabric loop cooperatively form a mounting ring structure for the filtration bag.

The stiffened bag mouth is seated on an annular shoulder formed by an annular ledge element 25 carried by flow duct 12. A clamp ring 27 is press fit into annular element 25 to partially encircle the stiff wire ring 23, such that the filtration bag 10 is rigidly suspended within the flow duct. As noted above, various mechanisms can be used to attach bag 10 to the flow duct 12. The present invention is more particularly concerned with the bag construction.

Bag 10 comprises an outer fabric sleeve 29 formed of any suitable porous woven fabric material, e.g. a tightly woven cotton cloth having a felt appearance and filtration capability. As shown in FIG. 2, sleeve 29 comprises a single fabric sheet formed into a cylindrical configuration, and having its side edges 49 sewn together to define a seam 31 extending parallel to the sleeve central axis 15.

Bag 10 further comprises an inner fabric liner 35 formed of any suitable porous woven fabric material, preferably the same material as sleeve 29. The fabric liner has a multiplicity of circumferentially spaced pleats (or folds) 37 that are stitched to the inner surface of fabric sleeve 29 to form eight vertical tubes or pockets 39 spaced around the bag circumference. As shown in FIG. 2, each fabric tube or pocket 39 has a generally segment cross-sectional shape. The fabric liner 35 is formed into loops having greater circumferential lengths than the corresponding sections of sleeve 29, whereby the liner walls protrude from sleeve 29 toward central axis 15 to form the three dimensional pockets 39.

A fibrous coherent filler material 38 occupies each of the vertical pockets, such that the fluid in central space 16 is required to move through the fibrous filler material in order to reach the annular space 20 surrounding bag 10. Fibrous filler material 38 constitutes an ancillary filtration media for trapping particulates entrained with the flowing fluid.

Fibrous filler material 38 can comprise various materials and physical configurations, e.g. compacted strands of fiberglass filaments, fibrous cotton batting, or open-celled plastic foam inserts shaped to conform to the cross-sectional shape of each tube 39. The filler material is preferably continuous so that the fluid is required to flow through the filler material in order to reach space 20 surrounding the bag. Also, the filler material preferably has sufficient rigidity or coherence as to act as a spacer for preventing the liner 35 from flattening against the inner surface of sleeve 29.

Fabric sleeve 29 has a lower edge 41 that has an undulating configuration. After the sleeve has its side edges 49 sewn together to form seam 31, the arcuate areas of lower edge 41 can be pressed together and secured by two rows of stitches extending the full length of edge 41. The stitching closes the lower end of the bag, whereby the fluid is required to flow through the various pockets 39 in order to reach annular space 20 surrounding the bag.

FIG. 3, is a plan view, of a fabric assembly that can be used to make the bag shown in FIGS. 1 and 2.

FIG. 4, is a sectional view, taken on line 4—4 in FIG. 3.

FIGS. 3 and 4 show the bag components 29 and 35 in a flat condition prior to the operation of forming seam 31. Sheet 35 has an upper edge 51 spaced below the upper edge of sheet 29 to provide the fabric material for encircling the wire annulus 23. The lower edge 53 of sheet 35 is straight so that undulating edge 41 can be more easily sewn to close the lower end of the bag.

Pockets 39 are formed by stitching the liner sheet 35 and sleeve sheet 29 together to form pleats 37. Each pleat 37 preferably comprises two or more rows of stitches 47 spaced apart a slight distance, e.g. one quarter inch, so that adjacent pockets are spaced slightly apart. When the fabric assembly is formed into a bag configuration, as shown in FIG. 2, narrow crevices 55 are formed between the pockets 39.

The fibrous filler material 38 can be inserted into pockets 39 while the fabric assembly is in the flat condition of FIGS. 3 and 4. Preferably the same quantity of filler material is inserted into each pocket. The filler material acts as a spacer means to prevent the fabric loop sections of liner 35 from being flattened against the inner surface of sleeve 29. If the liner material were to have extensive facial contact with the sleeve material the porosity of the two fabric layers would be greatly diminished, such that the bag would unduly restrict the fluid flow. Filler material 38 prevents this undesired effect. The filler material can also contribute to the filtration action.

It will be seen from FIG. 2 that the pleated fabric liner 35 cooperates with cylindrical fabric sleeve 29 to form eight vertical fabric tubes or pockets 39; each fabric tube has a segment-shaped cross section. The fibrous filler material 38 is thus separated and confined within the fabric tubes. This is advantageous in that the liner 35 walls prevent the fibrous filler materials from spreading apart due to impaction by fluid surges. The fibrous tubes 39 pack and confine the filler material against fluid puncture, so that the filler material retains its continuity and spacer capability.

The pleated nature of liner 35 also increases the surface area presented to the fluid in central space 16. This is advantageous in that the filtration media will remain in a clog-free condition for a lengthened period of time. Initially, the fluid will flow predominantly into the narrow crevices 55 between the pleat walls.

Gradually, particulates will build up in narrow crevices 55. However, the arcuate apex surfaces 50 on the pockets 39 will provide alternate fluid flow paths, such that the filtration bag will continue to function.

A major advantage of the illustrated filtration bag is that the filler materials 38 give the bag side wall a depth dimension, whereby the bag is enabled to remain in a relatively clog-free condition for an extended period of time. The filler materials 38 are packed or confined within eight separate tubes, so that the filler materials are supported against undesired puncture by fluid forces. Fabric pleats 37 provide narrow fold spaces or crevices 55 that can hold significant quantities of particulates, while the apex areas 50 continue to handle the fluid flow.

FIG. 5, is a fragmentary sectional view, taken in the same direction as FIG. 2, but illustrating another embodiment of the invention.

FIG. 5 illustrates an alternate arrangement wherein the filler material 38 in each pocket is replaced by a rigid filler material 57. Filler material 57 can be a rigid plastic insert element having a Y cross section, whereby the arms of the Y hold the looped section of fabric liner 35 away from the inner surface of fabric sleeve 29. Holes may be formed through the Y-shaped insert to facilitate fluid flow through the pocket.

The present invention is believed to provide an improved filtration bag, due to the fact that the bag has multiple fabric layers stitched together at circumferentially spaced points to form a multiplicity of fabric pockets. The drawings herein necessarily depict specific structural features and embodiments of the filtration bag, useful in the practice of the present invention.

However, it will be appreciated by those skilled in the arts pertaining thereto, that th present invention can be practices in various alternate forms and configurations. Further, the previously detailed descriptions of the preferred embodiments of the present invention, are presented for purposes of clarity of understanding only, and no unnecessary limitations should be implied therefrom. Finally, all appropriate mechanical and functional equivalents to the above, which may be obvious to those skilled in the arts pertaining thereto, are considered to be encompassed within the claims of the present invention.

What is claimed is:

1. A filtration bag for a flowing fluid, comprising:

an outer fabric sleeve (29) having a first end edge, and a second undulating end edge (41);

said undulating edge having areas thereof pressed together and secured by stitches, to close the fabric sleeve at said second end edge;

a wire annulus (23) located at said first end edge of the fabric sleeve;

said fabric sleeve being looped around said wire annulus at said first end edge to form a reinforced mounting ring structure for the bag;

said ring structure being adapted for positionment in a rigid flow duct so that fluid flowing through the duct is subjected to a filtration action by the bag;

said outer fabric sleeve having a circular cross-section concentric around a central fluid flow axis (15);

an inner fabric liner (35) located within said sleeve;

separate stitch means (47) extending through said fabric liner and said sleeve to directly connect the liner to the sleeve at circumferentially spaced points around the sleeve;

each said stitch means extending parallel to said central axis;

sections of said liner between said separate stitch means being looped away from the fabric sleeve toward the sleeve central axis to form plural hollow pockets (39);

the walls of each pocket being convergent in a direction going toward the central axis, to form apex areas (50) spaced from the fabric sleeve;

said pockets being circumferentially spaced to form crevices (55) between the pockets; and a filler material (38, 57) filling each pocket so that the pockets are prevented from collapsing due to fluid flow forces.

\* \* \* \* \*